United States Patent
Zabbatino (10) Patent No.: US 8,496,308 B2
(45) Date of Patent: *Jul. 30, 2013

(54) INDIVIDUAL LOCKER ASSEMBLY FOR REFRIGERATORS

(76) Inventor: Joseph Zabbatino, Brooklyn, NY (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/326,042

(22) Filed: Dec. 14, 2011

(65) Prior Publication Data

US 2012/0209763 A1    Aug. 16, 2012

Related U.S. Application Data

(63) Continuation-in-part of application No. 13/028,769, filed on Feb. 16, 2011, now Pat. No. 8,434,838.

(51) Int. Cl.
*A47B 96/04* (2006.01)

(52) U.S. Cl.
USPC .......................................... 312/407; 312/404

(58) Field of Classification Search
USPC .............. 235/132 R; 340/5.52; 312/236, 286, 312/404, 407
See application file for complete search history.

(56) References Cited

U.S. PATENT DOCUMENTS

| | | | |
|---|---|---|---|
| 1,733,794 A | 10/1929 | Goss | |
| D138,391 S | 8/1944 | Baird | |
| 2,404,851 A | 7/1946 | Knowles et al. | |
| 2,421,439 A | 6/1947 | Smith | |
| 2,484,572 A | 10/1949 | Jude | |
| 2,776,035 A | 1/1957 | Hebel | |
| 4,317,607 A | 3/1982 | Gomolka | |
| 5,605,047 A | 2/1997 | Park et al. | |
| 5,910,163 A | 6/1999 | Schlamp | |
| 6,806,807 B2 * | 10/2004 | Cayne et al. | 340/5.52 |
| D529,055 S | 9/2006 | Okamoto et al. | |
| 2010/0256800 A1 | 10/2010 | Heffron | |

FOREIGN PATENT DOCUMENTS

| | | |
|---|---|---|
| FR | 2689221 | 10/1993 |
| GB | 2190137 | 11/1987 |

OTHER PUBLICATIONS

Website, http://www.thegreenhead.com/2009/11/fridge-locker-personal-food-security-system.phb, Fridge Locker Personal Food Security system, two pages printed from the internet on Dec. 18, 2010.

* cited by examiner

*Primary Examiner* — Daniel Hess
(74) *Attorney, Agent, or Firm* — Richard C. Litman (57) ABSTRACT

The individual locker assembly for refrigerators is intended for use in the workplace for employees to secure their perishable foods and beverages. The locker assembly is also suitable for installation in refrigerators in medical offices and the like for the secure storage of controlled medications and the like that must be refrigerated. The locker assembly has a series of panels and dividers installable in an existing refrigerator unit, with the panels and dividers defining a series of individual lock boxes, each having its own lockable door. Alternatively, a specially configured refrigerator has an open front and a series of individual lock boxes installed therein. Each lock box is in contact with other boxes and/or the walls, floor, and top panels of the refrigerator, and is thermally sealed thereto. Each lock box has its own lockable door. The refrigerator includes a system for automating the lock box rental transactions.

5 Claims, 8 Drawing Sheets

INDIVIDUAL LOCKER ASSEMBLY FOR REFRIGERATORS

CROSS REFERENCE TO RELATED PATENT APPLICATION

This application is a continuation-in-part of U.S. patent application Ser. No. 13/028,769, filed on Feb. 16, 2011, now U.S. Pat. No. 8,434,838.

BACKGROUND OF THE INVENTION

1. Field of the Invention

The present invention relates to storage containers and the like, and particularly to an individual locker assembly for refrigerators. The lockers are installable within a standard or custom refrigerator and are individually securable to protect the contents therein.

2. Description of the Related Art

Refrigerators are commonly found in cafeteria and kitchenette areas in the workplace to allow employees to place perishable items therein for their lunches and snacks. While most employees are honest about such matters, there often seems to be one or more people who abuse the privilege of refrigerated storage for their goods, and who will take others' food and beverages stored in the refrigerator. In some instances, this has led to arguments and accusations as to whose goods were taken by whom. This is clearly disruptive in the workplace and has on occasion resulted in the employer installing surveillance equipment, sometimes resulting in official punishment or even the threat of job termination of employees by employers who become aware of such problems.

Another area in which refrigerators are commonly used in the workplace is in the medical field. Refrigerators are generally provided in medical offices, hospitals, and the like, and even veterinary offices for the proper storage of medicines and the like that require cold storage. Many of these medications require prescriptions to be legally dispensed, and while the vast majority of the staff having access to such supplies may very well be trustworthy, there is always some chance that such medicines and drugs may fall into the wrong hands if they are not properly secured. In some instances such refrigeration units for medical supplies are provided with a lock for the door. While this provides the desired security for those drugs and medications that require such, at least some of the supplies contained within the refrigerator may not need such security. This requires the person who needs such non-secure supplies to look up someone who has a key to unlock the refrigerator, each time such access is required.

Various secured refrigeration and freezer units have been developed in the past, ranging from commercial frozen food lockers to other smaller units. An example of such is found in French Patent No. 2,689,221, published on Oct. 1, 1993. This publication describes (according to the drawings and English abstract) an integrated refrigerated storage system having a plurality of separately lockable compartments and a single rearwardly disposed refrigeration unit.

None of the above inventions and patents, taken either singly or in combination, is seen to describe the instant invention as claimed. Thus, an individual locker assembly for refrigerators solving the aforementioned problems is desired.

SUMMARY OF THE INVENTION

The individual locker assembly for refrigerators comprises a series of top, bottom, side, and rear panels having another series of horizontal shelves and vertical dividers installing therein. The various panels, shelves and dividers define a plurality of individual storage units within the assembly. The panels, shelves and dividers have ventilation holes therethrough to provide for chilled air circulation throughout all of the compartments. Intermediate shelves and dividers have mating slots for engagement with one another. The two side panels and the rear panel have shelf support brackets extending inwardly therefrom.

Each unit has its own separably lockable front door. The locks may be of any practicable type, e.g., combination, key, external hasp and padlock, etc. Doors with integral locks may include provision for coin operation of the locks, if desired.

Spring-biased posts or pins extend from the upper and lower edges of the various vertical panels to engage mating holes in the upper and lower panels of the refrigeration unit, thereby locking the locker assembly in place within the refrigerator. The refrigerator may be a conventional unit, the locker assembly being installed in the refrigerator compartment once the refrigerator shelves have been removed, or the refrigerator may comprise a custom-configured unit devoid of a freezer compartment and configured for the installation of the locker assembly therein. The locker assembly may be assembled from a series of individual horizontal and vertical panels, or may alternatively be formed as an integral unit ready for installation in a compatible refrigerator.

Additional embodiments comprise a large refrigerator having an open front, with a series of individual lock boxes installed therein. The front panels of the individual boxes are in contact with one another, with appropriate thermal insulation being provided between adjacent boxes and/or the top, bottom, and side panels of the refrigerator to seal the front of the refrigerator thermally. In this embodiment the individual units are preferably opened electronically, with the customers or users gaining access by means of credit card accounts or prearranged payments for rental of the units. A financial transaction system for operating the individual refrigerator lock boxes is also disclosed.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The individual locker assembly for refrigerators comprises various embodiments of a locker assembly that provides for the secure individual storage of food, medication, and/or other articles within a refrigerator. The assembly includes a plurality of individually and independently openable and lockable units. Each of the units permits the person having access thereto to securely store and access materials therein as desired, without concern that others may take any such goods belonging to the person having access to the unit.

Figure 1:
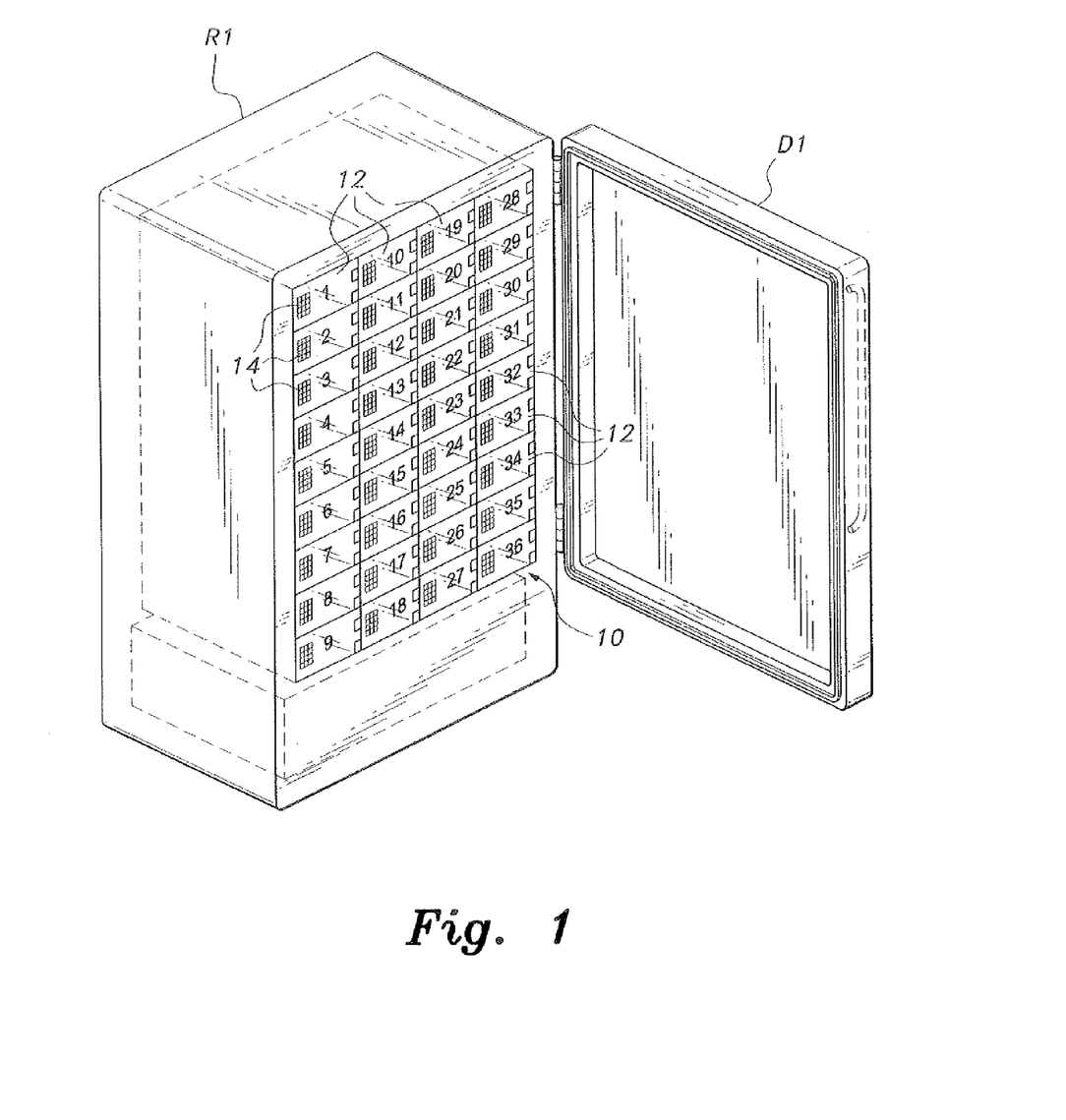
FIG. 1 is an environmental, perspective view of an individual locker assembly for refrigerators according to the present invention, the locker assembly being shown installed in a refrigerator.

FIG. 1 of the drawings is an illustration of an exemplary individual locker assembly 10, showing the assembly 10 installed in a refrigerator R1. The refrigerator R1 may be a specialized unit devoid of a separate freezer compartment, as the locker assembly 10 comprises a unitary construction when assembled and would generally only be installed within the portion of the refrigerator having temperatures above freezing. However, alternative constructions of the individual locker assembly may be configured for installation in conventional refrigerators having separate freezer compartments, as shown in FIG. 2 and discussed further below.

The individual locker assembly 10 is constructed from a plurality of horizontal and vertical panels to define a corresponding series of individual storage compartments 12. In the example of FIG. 1, a series of ten horizontal panels comprising a bottom panel, top panel, and eight intermediate shelves, and a set of six vertical panels comprising a left side panel, right side panel, rear panel, and three intermediate vertical panels, define a nine-by-four matrix of thirty-six individual storage compartments 12, each identified by a unique number. Alternatively, the locker assembly 10 (and the locker assembly 110 of FIG. 2) may be formed (e.g., molded, etc.) as a single integral structure, if desired.

Each storage compartment 12 has its own separate independently lockable door extending across the front opening. Each door is shown selectively secured by a push-button combination lock 14 in the example of FIG. 1, although other types of locks may be used. Opening the main door D1 of the refrigerator R1 provides access to all of the individual doors and locks of the locker assembly 10, allowing any individual assigned to any one of the units or compartments to access the lock and door thereto.

Figure 2:
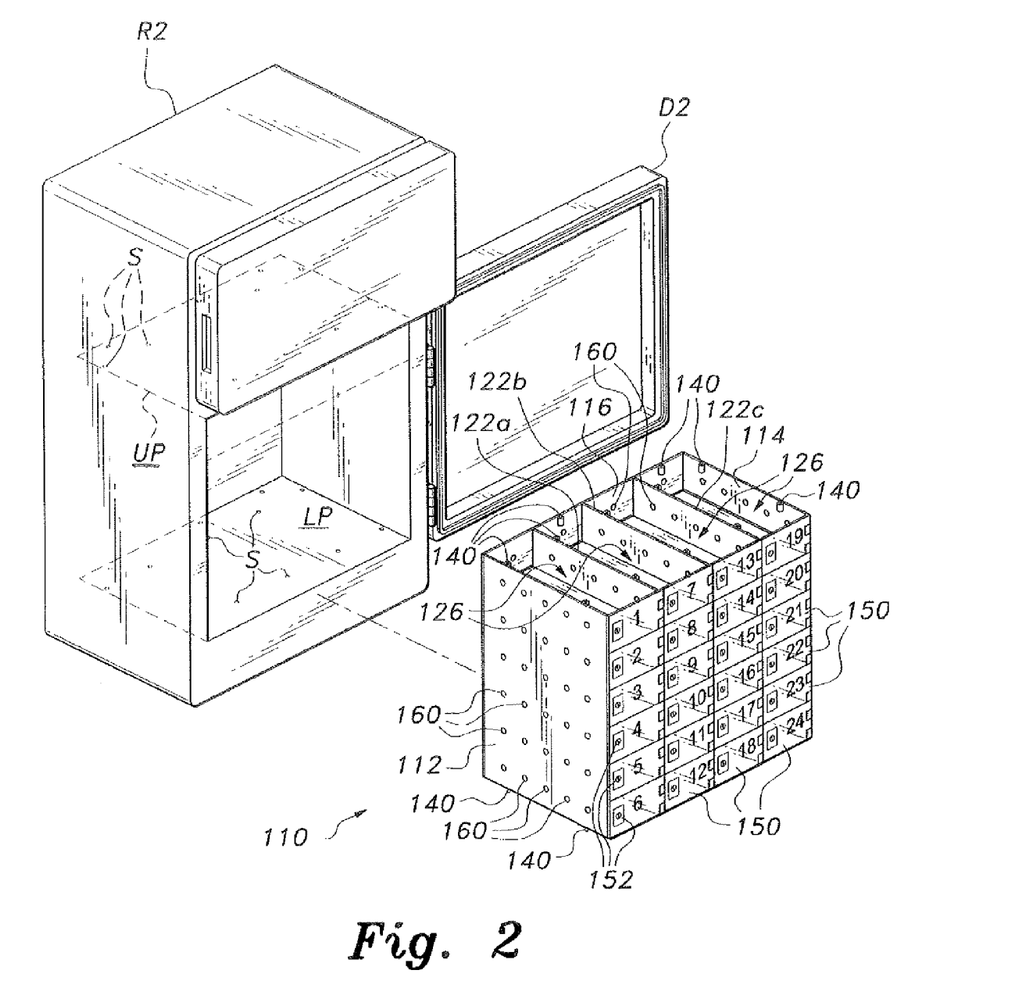
FIG. 2 is an exploded perspective view showing an alternative embodiment of an individual locker assembly for refrigerators according to the present invention, the assembly being shown removed from the interior of a refrigerator.
Figure 3:
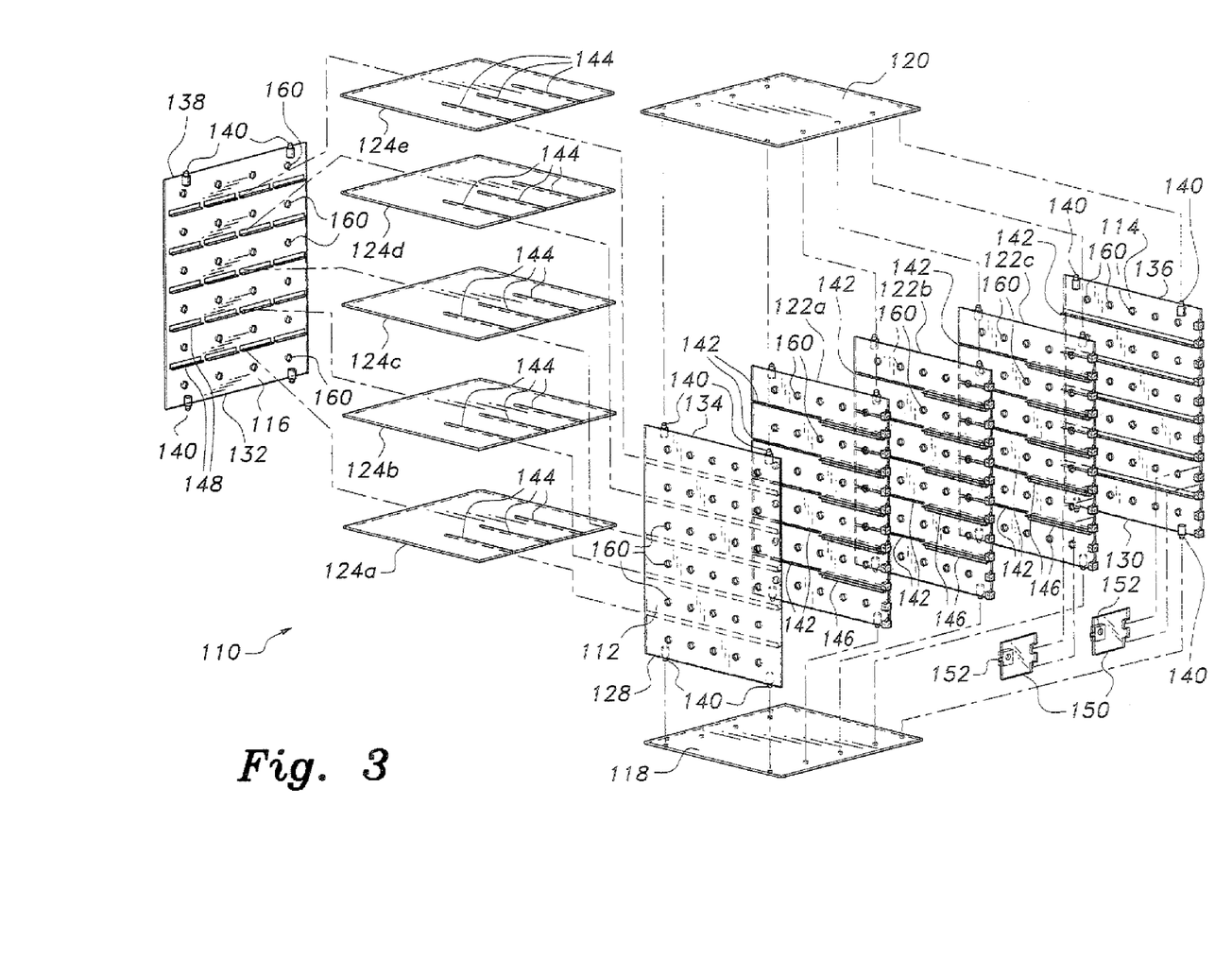
FIG. 3 is an exploded perspective view of an exemplary individual locker assembly for refrigerators according to the present invention, showing its various components.

FIG. 2 provides an exploded perspective view of an alternative embodiment of an individual locker assembly 110 separated from its refrigerator R2, while FIG. 3 provides an exploded perspective view of the individual components forming the locker assembly 110. The individual locker assembly 110 includes laterally opposed first and second side panels 112 and 114, a rear panel 116, a bottom panel 118, an opposite top panel 120 (removed in FIG. 2 to show the interior of the assembled locker assembly 110), one or more intermediate dividers, e.g., three such dividers 122a through 122c in the example of FIG. 3, and one or more intermediate shelves, e.g., five such shelves 124a through 124e in the example of FIG. 3. These various panels and shelves define a matrix comprising four compartments wide by six compartments high, or a total of twenty-four compartments. These compartments are designated by the reference numeral 126 in FIG. 2. The topmost row of compartments 126 is shown in FIG. 2 due to the removal of the top panel 120 in the drawing. It will be seen that the number of compartments may be adjusted, depending upon the number of intermediate panels and shelves used.

Each of the two side panels 112, 114 and the rear panel 116 have lower edges 128, 130, and 132, and opposite upper edges 134, 136, and 138. The bottom panel 118 spans the lower edges 128 through 132 of the side and rear panels 112 through 116, and the top panel spans the upper edges 134 through 138 of the side and rear panels. The upper and lower edges 128 through 138 of the side panels 112, 114 and the rear panel 116 also have a plurality of pins 140 extending therefrom. The pins 140 are urged outward from their respective edges by resilient springs or other suitable means. The refrigerators in which the individual locker assemblies are installed are adapted for such installation by having a corresponding plurality of locker engagement assembly receptacles or sockets S in their lower interior panels LP and upper interior panels UP, as shown in the exemplary refrigerator R2 of FIG. 2. The pins 140 lock into these corresponding receptacles or sockets S in the upper and lower interior panels LP and UP of the refrigerator, thus securing the individual locker assembly within the refrigerator. The pins 140 may be withdrawn for removal of the locker assembly, if desired, by opening the individual compartment doors along the upper and lower rows of compartments to access the pins.

Each of the intermediate dividers has a plurality of shelf engagement slots 142, which correspond in number to the number of intermediate shelves, that extend from the rear edge medially to about the middle of the divider. Similarly, each of the intermediate shelves has a plurality of divider engagement slots 144 therein, which correspond in number to the number of intermediate dividers, that extend from the front edge medially to about the middle of the shelf. The slots 144 in the intermediate shelves, e.g., shelves 124a through 124e, are slid into the slots 142 of the intermediate dividers, e.g., dividers 122a through 122c, to interlock to form an orthogonal matrix of shelves and dividers. Each of the dividers 122a through 122e and the parallel side panels 112 and 114 includes flanges 146 (e.g., angles attached to the surfaces of the dividers and panels, with one leg thereof extending laterally) or other shelf supports that extend from about the middle of the divider or panel to the front to support the edges of the shelves in the front half of the assembly 110. Similarly, the rear panel 116 includes a plurality of flanges 148 on its front face to support the rearward edges of the shelves.

Each of the compartments 126 formed by the assembly of the various panels and shelves has a front having a door 150 selectively extending thereacross. The doors 150 are preferably formed of a transparent plastic material to enable the users of the device to see what foods or other materials they have left in their individual locker compartments (if any) prior to unlocking and opening their compartments. The doors 150 are pivotally attached to an adjacent forward edge of one of the side panels, e.g., the second side panel 114, or to the forward edge of one of the intermediate panels 122a through 122c, using a conventional hinge arrangement. The hinge components affixed to the side and intermediate panels may include upwardly extending pintles that engage corresponding passages in lugs along the hinge attachment side or edge of each door, allowing the doors 150 to be lifted from the pintles for removal when the entire individual locker assembly 110 is removed from its refrigerator. Much the same structure is provided for the doors of the locker assembly 10 of FIG. 1. The opposite edge of each door includes some means for locking the door to the front of the corresponding side panel or intermediate panel, depending upon the location of the door. In the example of FIG. 1 the locks 14 are pushbutton combination locks, as described further above in the discussion of the individual lock assembly 10 of FIG. 1. In the example of FIGS. 2 and 3, each lock 152 comprises a key actuated lock. It will be seen that any practicable lock may be installed.

Figure 4:
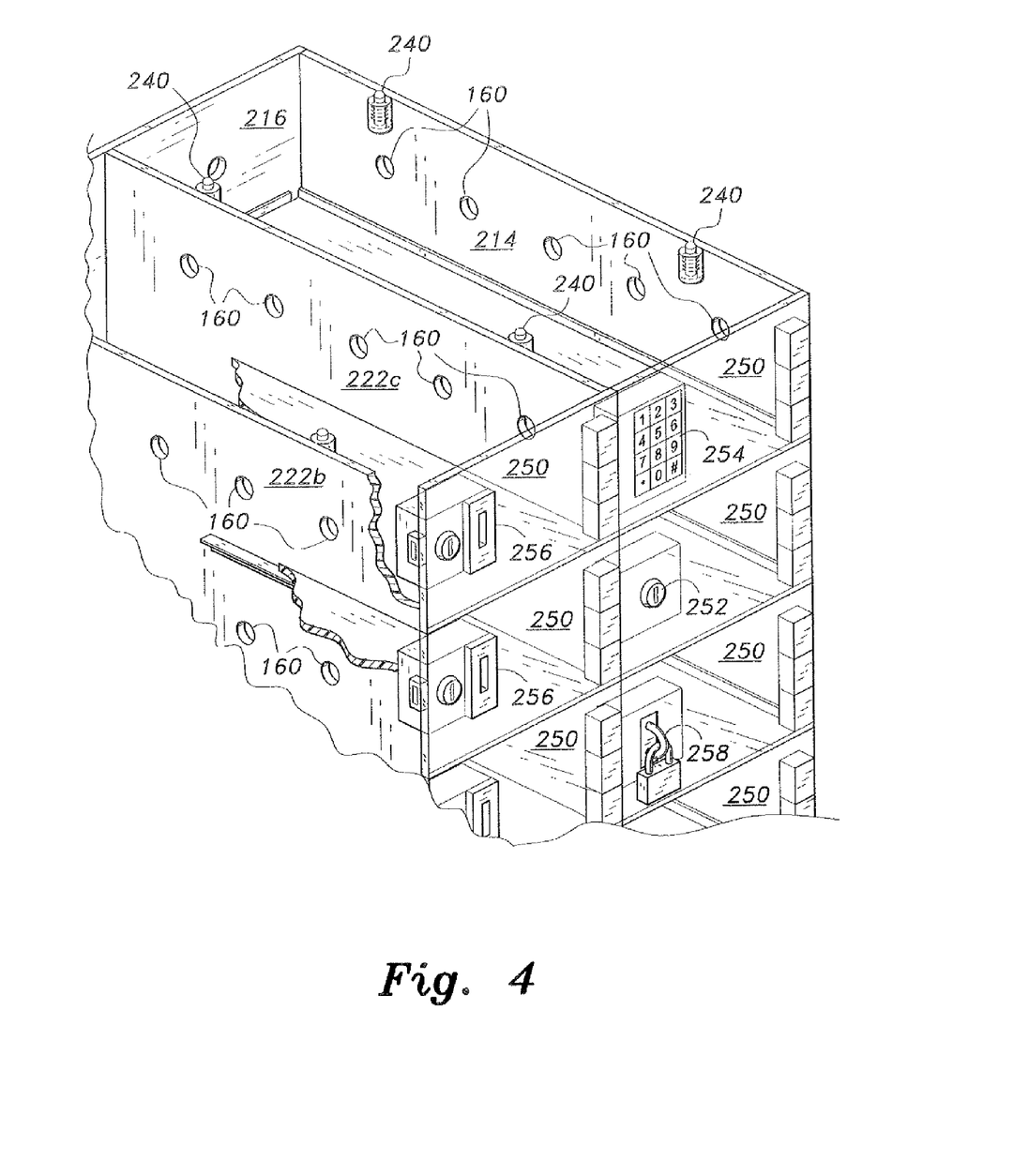
FIG. 4 is a partial perspective view of an individual locker assembly for refrigerators according to the present invention, broken away and partially in section to show details thereof.

FIG. 4 provides a perspective view of another exemplary individual locker assembly, broken away so that portions of the second side panel 214, rear panel 216, intermediate panels 222b and 222c, and intermediate shelves 224c, 224d, and 224e are visible. The reference numerals of the components illustrated in FIG. 4 correspond to like components in the locker assembly 110 of FIGS. 2 and 3, but with the leftmost (hundreds) digit being a 2 in the example of FIG. 4, rather than a 1 as in the example of FIGS. 2 and 3. The side panel 214 and intermediate panels 222b, 222c also have resiliently disposed pins 240 extending upward to engage corresponding receptacles in the upper interior panel of the refrigerator. A variety of different locks are shown installed on the doors 250 of the locker assembly portion illustrated in FIG. 4. For example, a pushbutton combination lock 254 is illustrated as the locking means for the upper right door in FIG. 4. Alternatively, a key-type lock 252 is installed on the door immediately below the pushbutton combination lock 254. The vertical row of doors that close off the compartments between the intermediate dividers 222b and 222c each has a coin-operated key-type lock 256 installed therein. In some instances it may be desirable for the owner or operator of the locker assembly to collect some payment for the use of the device, and the installation of coin-operated locks will permit such collection. It will be seen that such coin-operated locks are conventional, and for that matter other types of coin-operated locks (dial or pushbutton combination, etc.) may be installed with any of the embodiment of the individual locker assembly. In addition, or in lieu of the above lock types, a simple hasp and staple 258 may be installed, with the user of each locker compartment providing his or her own lock (combination or key-type padlock, etc.). It should be noted that the various types of locks illustrated in FIG. 4 would not likely be used with a single individual locker assembly, as shown in FIG. 4. Rather, FIG. 4 is used to show the variety of different lock types that may be used with the locker assembly.

The individual locker assemblies in any of their embodiments may be provided as a series of individual flat panels to be assembled to form the completed structure, or may alternatively be formed as a unitary structure ready for installation in a compatible refrigerator. The individual locker assemblies may be constructed to provide any practicable number of individual compartments therein, the sizes of the compartments depending upon the spacing between shelf and divider slots and flanges and the corresponding supports and flanges of the side and rear panels. The various panels, dividers, and shelves are preferably formed of sheet plastic for economy and durability, although other materials (e.g., sheet metal, wood, composite sheet material) may be used. Each of the various vertical panels, i.e., side panels, rear panel, and dividers, is provided with a plurality of ventilation passages therethrough, e.g., passages 160 of the individual locker assembly 110 of FIGS. 2 and 3, or passages 260 of the locker assembly portion illustrated in FIG. 4. Such ventilation passages provide for the circulation of cold air through all of the compartments of the device, thereby keeping food and/or other goods that require refrigeration, fresh until used.

Figure 5:
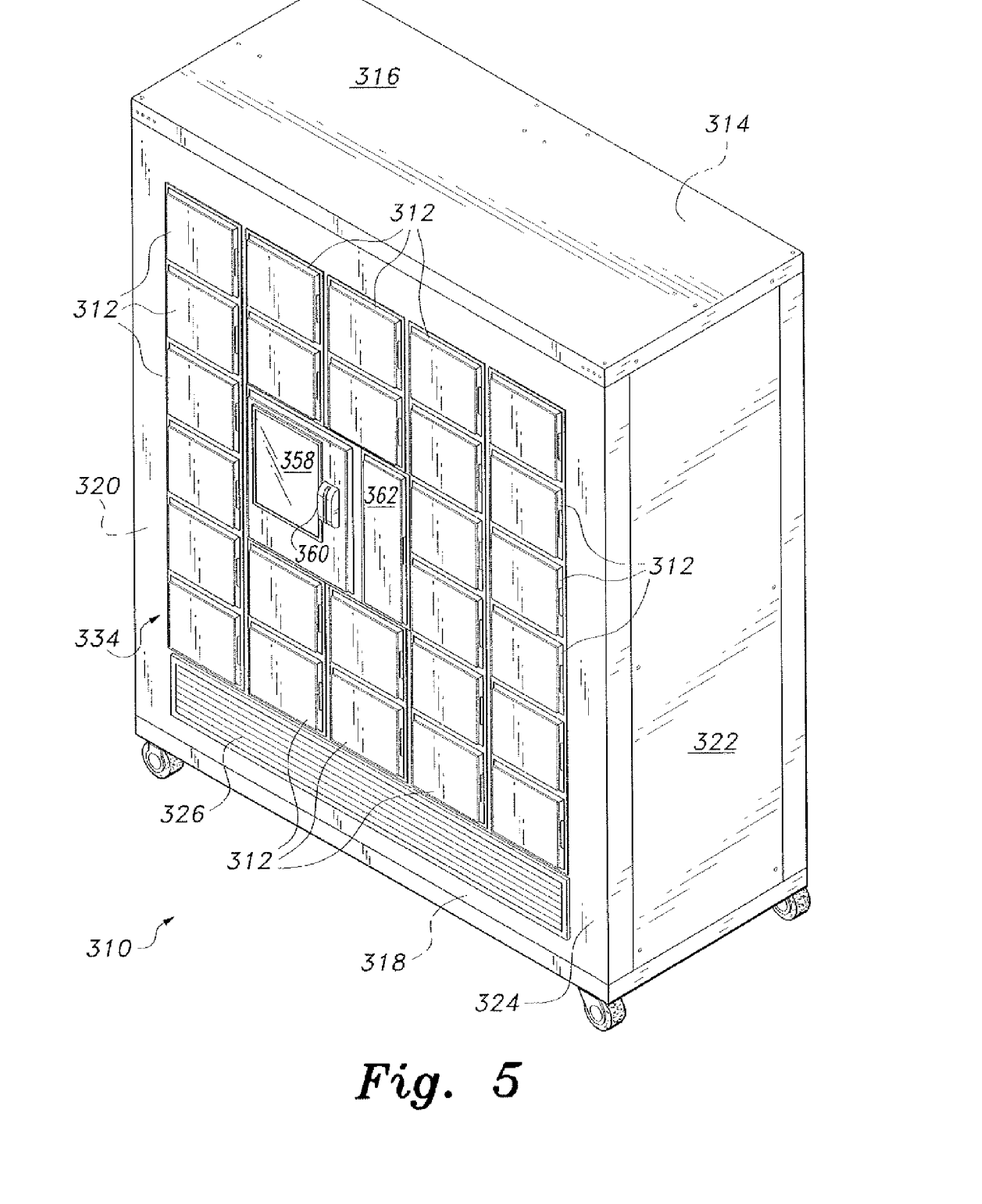
FIG. 5 is a front, side, and top perspective view of an exemplary refrigerator unit containing a plurality of individual locker assemblies for refrigerators according to the present invention.
Figure 6:
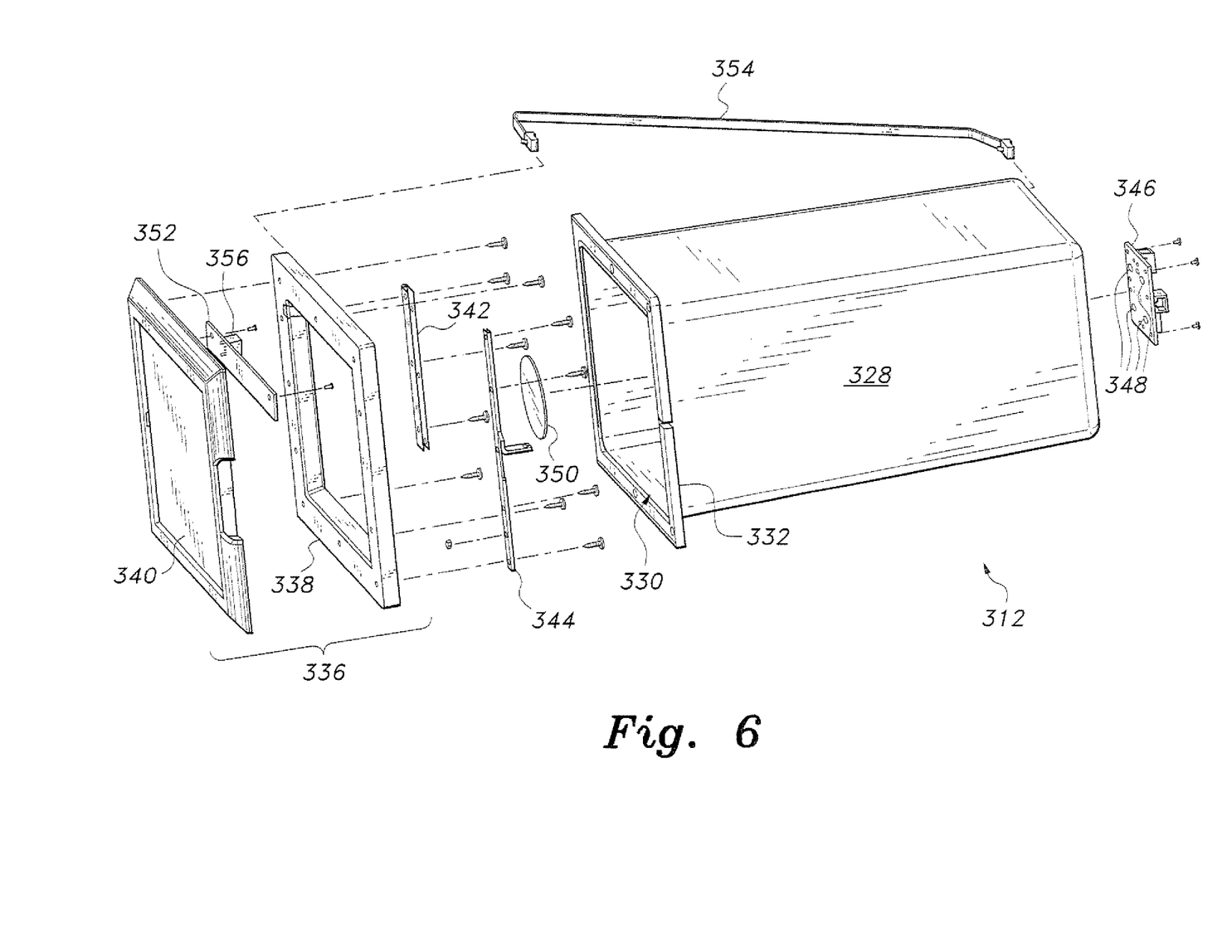
FIG. 6 is an exploded perspective view of an individual locker assembly for refrigerators according to the present invention, adapted for installation in the refrigerator unit of FIG. 5.
Figure 7:
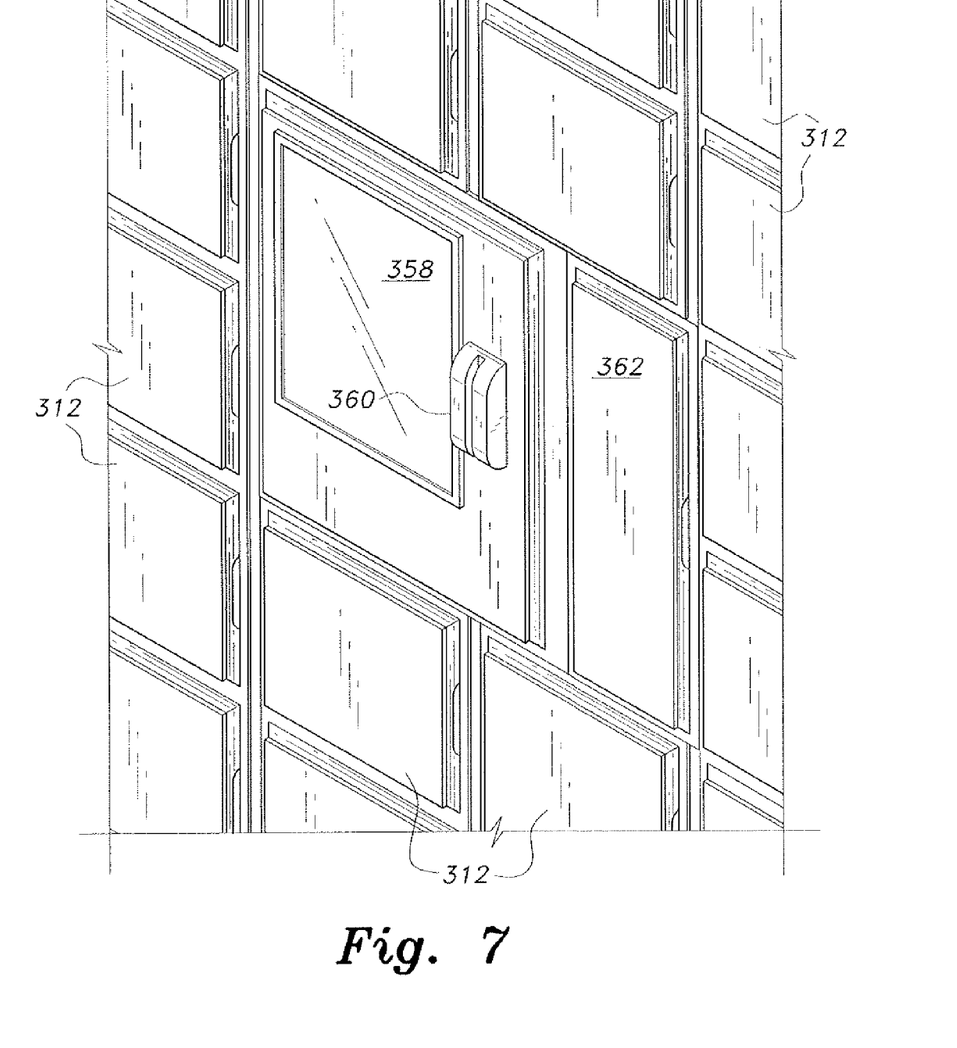
FIG. 7 is a detail perspective view of the computer screen, card swipe slot, and community storage compartment door of the refrigerator unit of FIG. 5.
Figure 8:
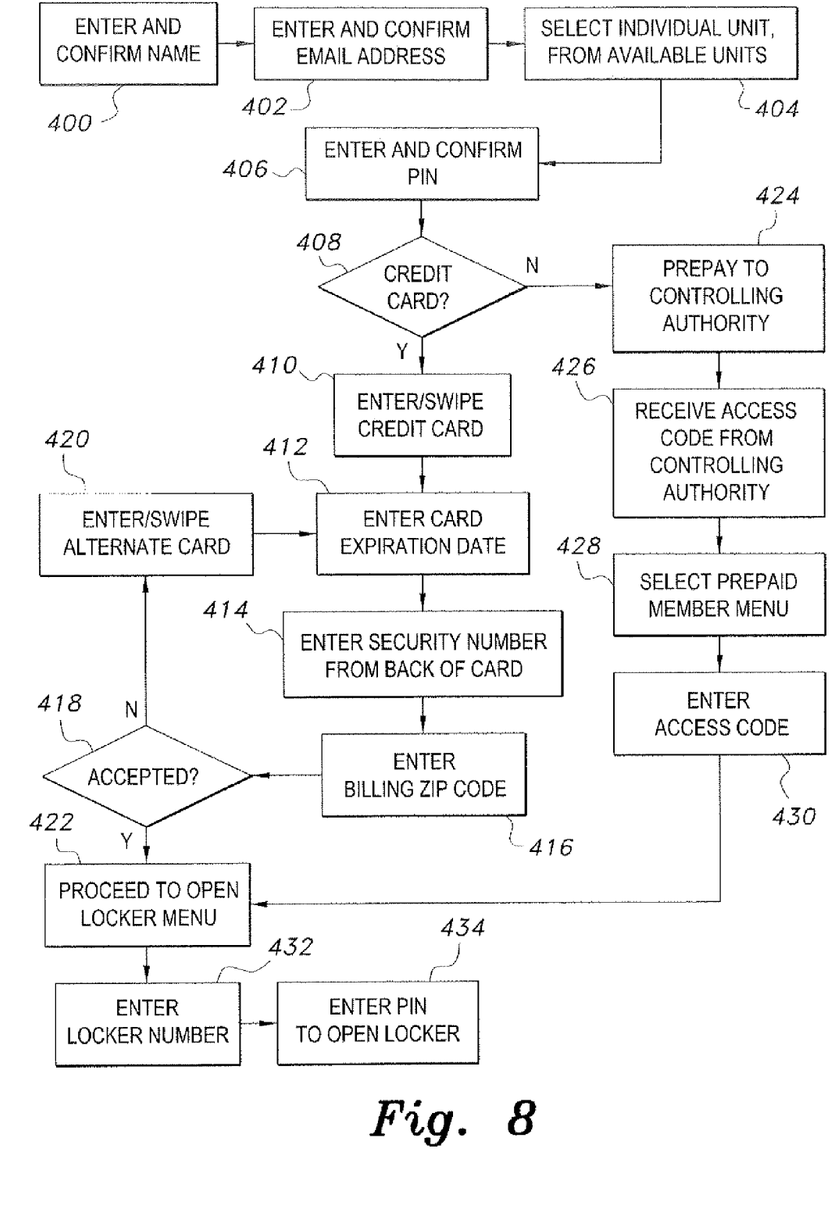
FIG. 8 is a flowchart briefly describing the steps in a financial transaction method for accessing one of the individual locker assemblies for refrigerators according to the present invention.

FIGS. 5 through 7 illustrate various aspects of another embodiment of the individual locker assemblies for refrigerators, while FIG. 8 provides a flowchart of the basic steps in a method of renting and accessing one of the locker assemblies. FIG. 5 provides a perspective view of a refrigerator 310 having a plurality of individual lock boxes 312 installed therein. The refrigerator has a closed back panel 314, closed top panel 316, closed bottom panel 318, and closed left and right side panels 320 and 322. The front panel 324 is open to provide for the installation of the lock boxes 312 therethrough and into the interior of the refrigerator 310. The refrigerator 310 is otherwise conventional, having a conventional compressor, evaporator coils, and other refrigeration components installed therein, e.g., behind the lower ventilation or kick panel 326 of the lower portion of the front panel 324, or other location according to manufacture.

FIG. 6 of the drawings provides an exploded view of a single one of the individual lock boxes 312. The individual lock box 312 illustrated in FIG. 6 is exemplary, all of the other lock boxes being of substantially the same configuration. The lock box 312 includes a locker body 328 having an open front 330 and a thermally insulated door frame 332 therearound. The door frame 332 is somewhat larger than the cross-sectional dimensions of the locker body 328, and abuts tightly against the adjacent door frames of the adjacent lock boxes 312 to form a thermally insulated lock box assembly 334 that forms a tight thermal seal within the open front panel 324 of the refrigerator 310, as shown in FIG. 5.

Each individual lock box 312 includes a selectively openable door assembly 336 installed upon the door frame 332 to selectively open and close the open front 330 of the locker box body 328. The door assembly 336 is constructed of a thermally insulated open back 338 having a thermally insulated front panel 340 secured thereto. The front panel 340 may serve as an advertising panel, if desired. A hinge 342 secures the door assembly to the door frame 332. A striker plate 344 is attached to the door frame 332 opposite the hinge 342, and serves to latch the door assembly 336 closed or to allow the door assembly 332 to be opened in the conventional manner.

An electronic controller 346 is installed upon the back panel of each of the individual lock boxes 312. Each controller 346 communicates electronically with a central processing unit, as is known in the art. The controller 346 includes one or more lights 348 therein (e.g., LEDs, etc.) that are positioned to show through a clear or translucent window 350 installed in the back panel of the lock box body 328. The controller 346 actuates the lights 348 whenever the door assembly 336 is opened, as is conventional in refrigerators. An electromechanical door latch assembly 352 is installed in the door 336, and communicates electronically with the controller 346 by means of a cable 354. The door latch assembly 352 includes a solenoid 356 that communicates mechanically with the striker plate 344 to allow the door assembly 336 to be opened. The solenoid 356 receives an electrical signal from the controller 346 when the controller 346 receives the appropriate signals relating to proper actuation codes, etc., as described further below in the discussion of the method of operation of the system.

The system receives information from a user or renter by means of a conventional computer installed in the refrigerator 310. The computer preferably includes a touch screen 358 located in the front panel 324 of the refrigerator, generally as shown in FIGS. 5 and 7. The touch screen 358 provides the required data entry means for the system. Alternatively, a separate keypad or the like (not shown) may be provided. A credit card reader 360 is also provided to allow a renter to swipe his or her card therethrough to enable the financial transaction to allow the renter to rent one of the individual lock boxes 312. Additional volume in the refrigerator 310 is provided for a community access box 362, which may be adjacent to the computer screen 358 or elsewhere in the assembly. The community access box 362 is constructed substantially like the lock boxes 312, i.e., having an insulated door frame and a thermally insulated door disposed therein. However, the community access box 362 is not locked, but may be opened by anyone to access perishable commodities that might be used by renters of the lock boxes, e.g., milk or cream for coffee, condiments such as mayonnaise and ketchup, etc.

FIG. 8 of the drawings provides a flowchart briefly describing the basic steps in the method of making financial rental transactions for access and use of one of the individual lock boxes 312. A step-by-step menu may be provided on the touch screen 358, to guide a prospective renter through the process. Initially, a prospective renter enters and confirms his or her name using the data entry means (touch screen, etc.), generally as indicated by the first step 400 of FIG. 8. The prospective renter then enters and confirms his or her email address in order to receive rental renewal reminders and/or other information relating to the system, generally as indicated by the second step 402 of FIG. 8.

At this point, the prospective renter selects one of the individual lock boxes 312 from those that are available, generally as indicated by the third step 404 of FIG. 8. Notification of available lock boxes may be provided on screen or by appropriate lighting indicators on each individual lock box. The prospective renter then enters and confirms a personal identification number (PIN), as indicated by the fifth step 406 of FIG. 8.

When the identity of the prospective renter and a specific lock box have been established by the system in accordance with steps 400 through 406 as described above, the system will require input of a credit card number for payment, generally as indicated by the fifth step 408. Means are provided for a person who does not have or does not wish to use a credit card to rent one of the lock boxes, as described further below. Assuming that the prospective renter wishes to use a credit card, the card is entered or swiped through the reader 360 (FIGS. 5 and 7) to enter the card number, generally as indicated by the sixth step 410 of FIG. 8. The prospective renter will then be requested to enter the expiration date of the card, as indicated by the seventh step 412, the security code from the back of the card, as indicated by the eighth step 414, and the billing postal ZIP code for confirmation purposes, as indicated by the ninth step 416 of FIG. 8.

The credit card and associated data entered as indicated in steps 410 through 416 will either be accepted or rejected, generally as indicated by the tenth step 418 of FIG. 8. If the card is not accepted by the system, the prospective renter has the option of entering a different or alternate credit card, as indicated by the eleventh step 420 of FIG. 8. The prospective renter may then enter the card expiration date, security number, and ZIP code as indicated by the seventh through ninth steps 412 through 416, as in the first credit card entry attempt. When the credit card has been accepted, a menu will be displayed to instruct the renter to open the selected locker, generally as indicated by the twelfth step 422 of FIG. 8.

There may be situations in which the prospective renter is unwilling or unable to make the financial transaction for rental by means of a credit card. In such situations, the prospective renter may arrange for rental by prepayment to the controlling authority (e.g., franchise holder for the refrigerator 310 and its lock boxes 312, etc.), generally as indicated by the thirteenth step 424 of FIG. 8. In this situation, the prospective renter makes prepayment by suitable means (mailing a check, etc.) to the controlling authority. When the controlling authority has verified payment, the authority transmits an access code to the renter, e.g., to the email address provided by the prospective renter in the second step 402. The renter may then go to the refrigerator 310 and its lock boxes 312 and select the prepaid member menu on the computer screen 358, generally as indicated by the fifteenth step 428 of FIG. 8. The prepaid member menu will request that the renter enter his or her previously assigned access code (from the fourteenth step 426, further above), generally as indicated by the sixteenth step 430. Once this has been accomplished, the screen will display the open locker menu as provided at this stage for credit card payment users or renters, generally as indicated by the twelfth step 422.

Both credit card payment users or renters and prepayment users or renters will then be instructed to enter the previously selected locker number from the third step 404, as indicated by the seventeenth step 432 of FIG. 8. The user will then be instructed to enter his or her previously selected PIN from the fourth step 406, generally as indicated by the final, eighteenth step 434 of FIG. 8. The computer then sends a signal to the appropriate controller 346 of the selected individual lock box 312 (FIG. 6), which, in turn, sends a signal to the corresponding latch assembly solenoid 356 to allow the door assembly 336 to be opened.

Accordingly, the computer and its touch screen 358 and card reader 360 provide a system for fully automating the rental and use of the refrigerator 310 and its lock boxes 312. This greatly reduces the labor involved in such a system to only occasional maintenance and cleanout of unrented units, and other periodic maintenance as required. The resulting labor savings in turn reduces the overhead costs of operation of the device, thereby providing reductions in rental costs to the renters or users of the system. The use of advertising space on or in the door panels 340 of the individual lock boxes 312 provides further income for the controlling authority of the device, thus providing further potential savings for the renter or user.

It is to be understood that the present invention is not limited to the embodiments described above, but encompasses any and all embodiments within the scope of the following claims.

I claim:

1. An individual locker assembly for refrigerators, comprising:
   a refrigerator having closed back, top, floor, and side panels, and an open front panel;
   a plurality of individual lock boxes installed through the front panel of the refrigerator and adjacent to one another, wherein the plurality of lock boxes include:
     a first side panel having an upper edge and a lower edge opposite the upper edges;
     a second side panel disposed laterally opposite the first side panel, the second side panel having an upper edge and a lower edge opposite the upper edge;
     a rear panel extending between the first side panel and the second side panel, the rear panel having an upper edge and a lower edge opposite the upper edge;
     a bottom panel extending between the lower edge of first side panel and the lower edge of the second side panel;
     a top panel extending between the upper edge of the first side panel and the upper edge of the second side panel;
     a plurality of fasteners extending from the upper edges and the lower edges of the first side panel, the second side panel, and the rear panel, the fasteners being adapted for engaging corresponding locker assembly engagement assemblies in the bottom panel and the top panel;

a plurality of intermediate dividers disposed between the first side panel and the second side panel, each of the intermediate dividers has a plurality of shelf engagement slots defined therein extending from a rear edge into the divider;

a plurality of intermediate shelves disposed between the bottom panel and the top panel, so that the first side panel, the second side panel, the rear panel, the top panel, the bottom panel, the plurality of intermediate dividers, and the plurality of intermediate shelves define a plurality of individual compartments, each of the compartments having a front, each of the intermediate shelves has a plurality of divider engagement slots defined therein extending from a front edge into the shelf, the divider slots engaging the shelf and the shelf slot engaging the divider to orthogonally interlock the divider and the shelf to form walls of the compartments;

a plurality of mutually independent lockable doors extending across the corresponding front of each of the compartments, respectively;

each of the first side panel, the second side panel, the rear panel, and the plurality of intermediate dividers includes a plurality of ventilation passages disposed therethrough to accommodate the flow of refrigerated air through the locker assembly;

at least one community access box installed in the refrigerator, the community access box having an insulated door frame and an unlocked, thermally insulated door disposed in the door frame;

a computer screen disposed within the front panel of the refrigerator;

data entry means associated with the computer screen for entering data into a computer; and a credit card reader disposed within the front panel of the refrigerator.

2. The individual locker assembly for refrigerators according to claim 1, further comprising:

an electronic controller mounted on each of the individual lock boxes;

an electromechanical door latch assembly mounted on the door and the door frame of each of the individual lock boxes, the electromechanical door latch assembly communicating electronically with the corresponding electronic controller; and a lighting device disposed in each of the individual lock boxes, the lighting device being selectively actuated by the electronic controller and the electromechanical door latch assembly of the corresponding one of the individual lock boxes.

3. The individual locker assembly for refrigerators according to claim 1, further comprising an advertising panel disposed in the door of each of the individual lock boxes.

4. A method of making a financial transaction for the rental and access of one of the individual lock boxes of the individual locker assembly for refrigerators using the apparatus according to claim 1, further comprising the steps of:

(a) forming a user interface with the computer screen, data entry means and credit card reader disposed within the front panel of the refrigerator;

(b) receiving and confirming entry of the name of the renter through the user interface;

(c) receiving and confirming entry of the email address of the renter through the user interface;

(d) receiving user selection of one of the individual lock boxes from available lock boxes through the user interface;

(e) receiving and confirming entry of a personal identification number through the user interface;

(f) receiving payment arrangements for the lock box rental through the user interface;

(g) receiving entry of the selected lock box number through the user interface;

(h) receiving entry of the previously determined personal identification number through the user interface; and (i) releasing an electronic door latch mounted on the selected lock box to permit opening the lock box.

5. An individual locker assembly for refrigerators, comprising:

a refrigerator having closed back, top, floor, and side panels, and an open front panel;

a plurality of individual lock boxes installed through the front panel of the refrigerator and adjacent to one another, wherein the plurality of lock boxes include:

a first side panel having an upper edge and a lower edge opposite the upper edge;

a second side panel disposed laterally opposite the first side panel, the second side panel having an upper edge and a lower edge opposite the upper edge;

a rear panel extending between the first side panel and the second side panel, the rear panel having an upper edge and a lower edge opposite the upper edge;

a bottom panel extending between the lower edge of first side panel and the lower edge of the second side panel;

a top panel extending between the upper edge of the first side panel and the upper edge of the second side panel;

a plurality of fasteners extending from the upper edges and the lower edges of the first side panel, the second side panel, and the rear panel, the fasteners being adapted for engaging corresponding locker assembly engagement assemblies in the bottom panel and the top panel;

a plurality of intermediate dividers disposed between the first side panel and the second side panel, each of the intermediate dividers has a plurality of shelf engagement slots defined therein extending from a rear edge into the divider;

a plurality of intermediate shelves disposed between the bottom panel and the top panel, so that the first side panel, the second side panel, the rear panel, the top panel, the bottom panel, the plurality of intermediate dividers, and the plurality of intermediate shelves define a plurality of individual compartments, each of the compartments having a front, each of the intermediate shelves has a plurality of divider engagement slots defined therein extending from a front edge into the shelf, the divider slots engaging the shelf and the shelf slot engaging the divider to orthogonally interlock the divider and the shelf to form walls of the compartments;

a plurality of mutually independent lockable doors extending across the corresponding front of each of the compartments, respectively;

each of the first side panel, the second side panel, the rear panel, and the plurality of intermediate dividers includes a plurality of ventilation passages disposed therethrough to accommodate the flow of refrigerated air through the locker assembly;

a computer screen disposed within the front panel of the refrigerator;

data entry means associated with the computer screen for entering data into a computer; and a credit card reader disposed within the front panel of the refrigerator.

* * * * *